United States Patent
Sakoda

(10) Patent No.: US 7,071,440 B2
(45) Date of Patent: Jul. 4, 2006

(54) STUD WELDING APPARATUS

(75) Inventor: Kanji Sakoda, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/883,808

(22) Filed: Jul. 6, 2004

(65) Prior Publication Data

US 2005/0023252 A1    Feb. 3, 2005

(30) Foreign Application Priority Data

Jul. 9, 2003    (JP)    ............... 2003-194363

(51) Int. Cl.
*B23K 9/20*    (2006.01)

(52) U.S. Cl. .......................... 219/98; 219/99
(58) Field of Classification Search .................. 219/98, 219/99; 221/72

See application file for complete search history.

(56) References Cited

U.S. PATENT DOCUMENTS

| | | | | |
|---|---|---|---|---|
| 3,723,700 A | * | 3/1973 | Ettinger | 219/98 |
| 3,758,743 A | * | 9/1973 | Lake | 219/98 |
| 4,629,857 A | * | 12/1986 | Gauger | 219/98 |
| 5,384,445 A | * | 1/1995 | Nakagami | 219/98 |
| 5,426,276 A | * | 6/1995 | Gauger | 219/98 |
| 5,688,414 A | * | 11/1997 | Kondo | 219/98 |
| 5,798,494 A | | 8/1998 | Aoyama et al. | 219/98 |
| 6,015,962 A | | 1/2000 | Wiessler et al. | 219/98 |

FOREIGN PATENT DOCUMENTS

| | | |
|---|---|---|
| EP | 0 737 537 | 10/1996 |
| JP | 62-202977 | 9/1987 |
| JP | 62-155963 | 10/1987 |
| JP | 62202977 U | * 12/1987 |
| JP | 63-196368 | 12/1988 |
| JP | 2000-190077 | * 7/2000 |

* cited by examiner

*Primary Examiner*—Kevin Kerns
*Assistant Examiner*—Michael Aboagye
(74) *Attorney, Agent, or Firm*—Miles & Stockbridge P.C.

(57) ABSTRACT

A welding gun 10 has a collet for holding a stud with a flange and a shank at the tip of the welding gun. The collet comprises a tubular first collet member 17, secured to the tip, which elastically opens to a larger diameter than the stud flange, for holding the flange at the tip, and a tubular second collet member 22, secured to the tip of a piston rod 21 which extends from an air cylinder 11 provided in the aft portion thereof toward the first collet member, for, by the movement of the piston, picking up, accommodating, and holding the shank of a stud fed with its flange to the fore inside the first collet member 17. A collet cover 18 is provided for enclosing the exterior of the first collet member 17, from the tip end thereof, with the tip of the collet cover 18 and the tip of the first collet member forming a flange edge carrying space 54 for accommodating and holding the edge of the stud flange and holding the end of the stud shank in an attitude such that it floats free from the inner wall of the first collet member.

5 Claims, 9 Drawing Sheets

STUD WELDING APPARATUS

CROSS-REFERENCE TO RELATED APPLICATION

This application claims the benefit of Japanese Application No. 2003-194363 filed Jul. 9, 2003, incorporated herein by reference.

BACKGROUND OF THE INVENTION

The present invention relates to a stud welding apparatus, and more particularly to a mechanism for mounting flanged studs, having a flange and a shank, to the tip of a welding gun.

In Laid-Open Utility Model Application [Jikkai] No. S62-202977/1987, gazette publication (Patent Literature 1), a stud welding apparatus is disclosed which has a mechanism for mounting a flanged stud, having a flange and a shank, to the tip of a welding gun. In that stud welding apparatus, the collet for mounting a flanged stud to the tip of the welding gun is configured by a tubular first collet member that is secured to the tip of the welding gun for elastically holding the flange to the fore, and a tubular second collet member that is secured to a piston which extends from an air cylinder at the aft end of the welding gun toward the tip of the welding gun for picking up, accommodating, and holding the shank of a stud that has been fed inside the first collet member. By forming the collet of two tubular collet members, namely a first and second collet member, even if the stud is flanged, the amount of deformation will be diminished when the flange of the first collet member that is of an externally tubular shape extends and emerges, fatigue and breakage can be prevented, and the holding force is increased and electric power supply performance is enhanced because the stud is held by the second collet member as well as by the first collet member. A stud welding apparatus wherein a collet is formed of a first collet member and a second collet member is also disclosed in Laid-Open Utility Model Application No. S63-196368/1988, gazette publication (Patent Literature 2) and Laid-Open Utility Model Application No. S62-155963/1987, gazette publication (Patent Literature 3).

The stud welding apparatus described in Patent Literature 1 exhibits advantages such as preventing collet breakage and fatigue when mounting flanged studs to a welding gun, as noted above. However, in order to pick up, accommodate, and hold the tip of a stud shank that is at the surface of the inner wall of the first collet member with the second collet member, it is necessary to form a tapered part in the tip of the stud shank. This has resulted in the stud becoming longer. A long stud is disadvantageous in that it makes the welding gun longer, and it has not been possible to handle cases where it is desired to use short studs. The points of needing a tapered part at the tip of the stud shank and of the stud becoming longer are described with reference to FIG. 1 and FIG. 2. In FIG. 1, a stud 2 delivered to a first collet member 1 of a welding gun is placed inside the first collet member 1 with the flange 3 to the fore, and the tip of the shank 4 is in such condition that it is in contact with the inner wall surface of the first collet member 1. In this condition, compressed air is supplied to an air cylinder 5, a piston 6 moves toward the first collet member 1 end, and a second collet member 7 at the tip of a piston rod 6A picks up the tip of the stud shank 4 and accommodates and holds the shank inside the second collet member 7. However, because the tip of the stud shank 4 is in contact with the inner wall surface of the first collet member 1, even if the tip of the second collet member 7 has a tapered part 8, as diagrammed, it is very difficult to pick up unless floating sufficiently free of the inner wall surface of the first collet member 1 due to the taper of the tip of the stud shank 4.

FIG. 2 is a detailed view of a stud 2 capable of use in a welding gun like that diagrammed in FIG. 1. Unless the overall length L of the stud 2 was made larger by a fixed multiple of the diameter D of the flange 3, the stud 2 could not be picked up even if the tapered part 9 was formed in the tip of the shank 4. This was so because, when the overall length L of the stud was short, the gap necessary for picking up the tapered part 8 in the second collet member could not be secured between the tapered part 9 at the tip of the shank 4 and the inner wall surface of the first collet member 1. It is known from experience that it becomes easy for the tapered part 8 of the second collet member 7 to pick up the shank 4 when the angle $\alpha 1$ of the tapered part 8 at the tip of the second collet member 7 is made 45 degrees or less and the outer diameter of the second collet member 7 is made as close as possible to the inner diameter of the first collet member 1. It is also known from experience that, in order to stably hold and weld a stud, the length L of the stud 2 should be $L=F+b+L2+a \geq 1.4$ D.

Here, as indicated in FIG. 3, F is the length necessary for the second collet member 7 to hold the shank, b is the length of the tapered part 8 of the second collet member 7, L2 is the length of the tapered part 9 at the tip of the shank of the stud, and a is the length of stud protrusion from the tip of the first collet member 1 to the edge surface of the flange 3 (length necessary for welding). For example, the stud holding length is $F \geq 4$ mm, the stud protrusion length is a=3 mm, and fixed lengths are required therein, respectively.

Accordingly, in order to shorten the stud length L, it is only necessary to shorten the length b of the tapered part 8 of the second collet member 7 and the length L2 of the tapered part 9 at the end of the stud shank. However, in the case of the welding gun of the configuration noted in Patent Literature 1, for the reasons given above, b and L2 cannot be made shorter than a certain length. In Patent Literature 2 and Patent Literature 3, in order to pick up the tip of a stud shank with the second collet member, a configuration is adopted for supplying compressed air, separately from the compressed air supplied in the first collet member to the stud, for maintaining the attitude of the stud horizontal inside the first collet member, and thus aiding the second collet member in picking up the stud shank. With such a structure, the length L2 of the tapered part 9 at the tip of the stud shank can be shortened, but the structure of the welding gun and the control of the supply of compressed air are made complex. In Patent Literature 2, furthermore, there is also a configuration wherewith a stopper is deployed midway in the stud supply path of the first collet member to stop the stud feed and maintain the stud attitude horizontal. However, there is a danger of blocking the stud feed midway along the feed path.

BRIEF DESCRIPTIONS OF THE INVENTION

Accordingly, an object of the present invention is to provide a stud welding apparatus that makes it possible to shorten the stud length without making the configuration of the welding gun complex.

Another object of the invention is to provide an improved stud welding apparatus in which studs are aligned in a simple manner in a welding gun for advancement from the tip of the gun.

In a preferred embodiment, the present invention provides a stud welding apparatus that has a collet for holding a stud having a flange and a shank at the tip of a welding gun, which collet comprises a tubular first collet member secured to the tip of the welding gun, for elastically opening to a larger diameter than the stud flange so as to hold the flange at the tip, and a tubular second collet member secured to the tip of a piston rod that extends toward the first collet member from an air cylinder provided in the aft portion of the welding gun, capable of insertion into the first collet member, for, by the movement of the piston, picking up, accommodating and holding the shank of a stud fed with the flange to the fore into the interior of the first collet member, wherein a collet cover is provided for enclosing the exterior of the first collet from the tip end of the welding gun, and the tip of the collet cover and the tip of the first collet member form a flange edge carrying space for accommodating and holding the edge of the stud flange and holding the tip of the stud shank in an attitude such that it floats free of the inner wall of the first collet member.

More specifically, dividing channels extending in the axial direction are formed in the collet cover, to provide elasticity, such that, when a flange that is in the flange edge carrying space is pushed and moved, the tip opens to a larger diameter than the flange to allow the passage of the flange, and contracts in diameter after that passage to hold the stud shank together with the first collet member. The second collet member is such that the depth of the cylindrical member that accepts the stud shank is limited by a stop pin that extends from the piston rod. The collet cover, the first collet member, and the second collet member are formed of an electrically conductive material.

A receiver to which is linked a feed tube for feeding the studs is deployed between the first collet member and the air cylinder, the receiver has formed therein a stud feed path for guiding studs from the feed tube to the first collet member, a piston hole is formed in the stud feed path such that the piston of the air cylinder and the second collet member at the tip can advance into the interior of the first collet member, and an opening and closing gate is deployed in the stud feed path, which closes so as to prevent the studs from tumbling in the piston hole and opens so as not to impede the movement of the piston and the second collet member.

As described above, the stud is held in an attitude such that the tip of the shank is floating free from the inner wall, wherefore the stud shank is readily accommodated in the second collet member, any tapered part in the tip of the stud shank becomes altogether unnecessary, and the length b of the tapered part 8 of the second collet member diagrammed in FIG. 2 and FIG. 3 can be considerably shortened. In tests, it was possible to shorten the stud length L to a length of 1.0 D to 1.2 D (where D is the flange diameter). Also, the configuration is one involving only the addition of a collet cover, and does not require a complex configuration such as would supplying secondary compressed air as in the prior art indicated in Patent Literature 2 or 3, wherefore the structure of the welding gun continues to be simple, and no complex control of that compressed air is necessary. Furthermore, there is nothing to interfere with stud feed, such as a stopper or the like that temporarily stops the stud, so studs can be fed smoothly.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 4:
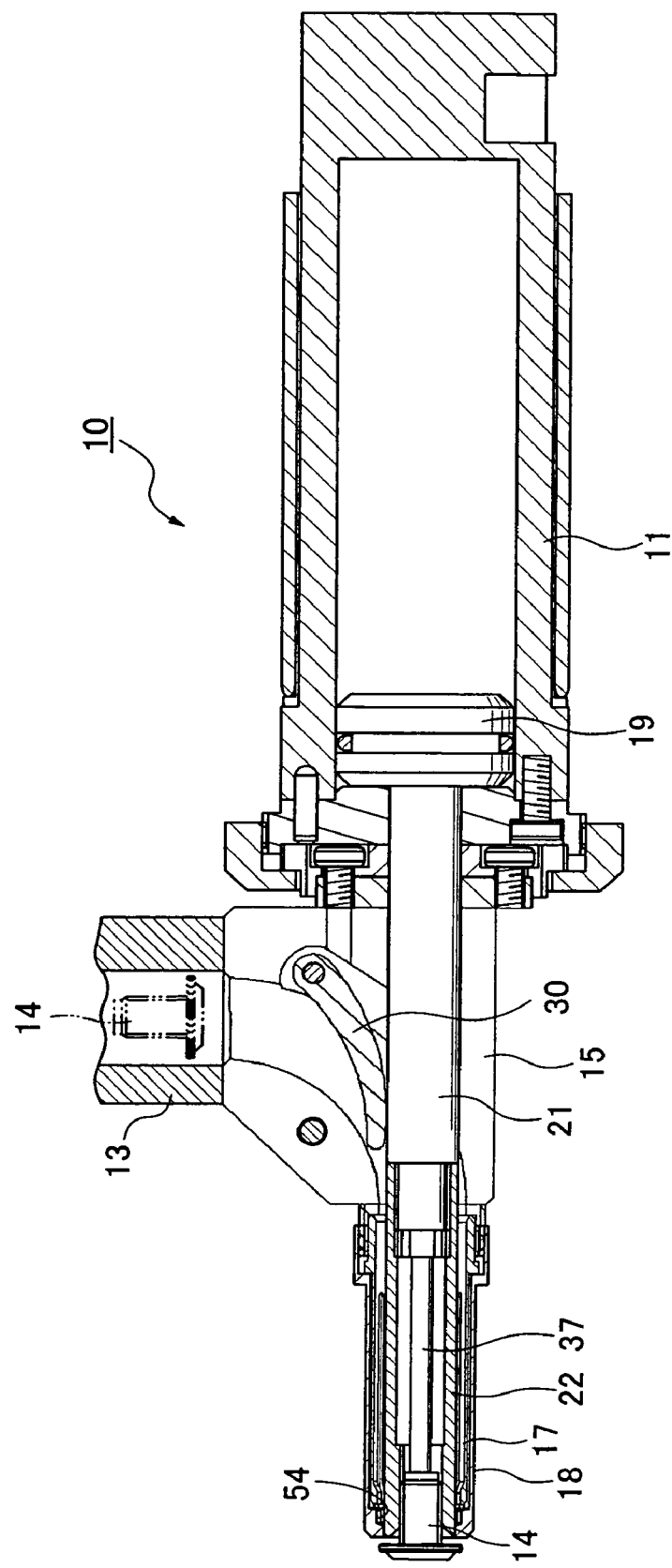
FIG. 4 is a section of a welding gun in a stud welding apparatus relating to an embodiment of the present invention.

Embodiments of the present invention are now described with reference to the drawings. FIG. 4 diagrams the welding gun 10 of a stud welding apparatus. The stud welding apparatus has, besides the welding gun 10, a conventional electric power supply and a conventional controller (neither shown in the drawings). The welding gun 10 comprises an air cylinder 11 that forms the aft portion of the gun, a receiver 15, linked to a feed tube 13 and forming the central part of the welding gun, for receiving studs 14 that are sent under pressure by compressed air through the feed tube 13, a tubular first collet member 17 that forms the tip part of the welding gun 10, and a tubular collet cover 18. A piston 19 is deployed in the air cylinder 11. The piston 19 is moved to the tip end of the welding gun 10 by the supply of compressed air to the air cylinder 11 on the back side of the piston, and is returned to its original position by the supply of compressed air to the air cylinder 11 on the front side of the piston as air is exhausted at the back side of the piston. To the piston 19 is linked a piston rod 21 which passes through the receiver 15 and extends to the first collet member 17. A tubular second collet member 22 is secured to the tip of the piston rod 21. The tubular second collet member 22 is made capable of insertion into the first collet member 17, and the first collet member 17 and second collet member 22 form the collet of the welding gun 10. More specifically, as diagrammed in FIG. 4, the second collet member 22 holds the shank of a stud 14 when in the state of being inserted into the first collet member 17, and the first collet member 17 holds the second collet member 22 that is holding the first collet member 17 when in the state of being extended out from the tip of the flange, constituting a collet that holds the stud 14, with its flange to the fore, at the tip of the welding gun 10.

Figure 5:
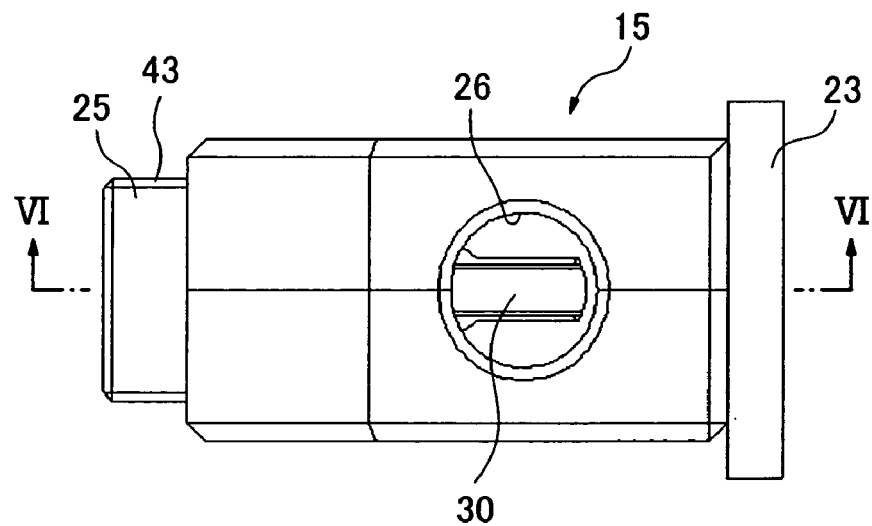
FIG. 5 is a plan of the receiver in the welding gun diagrammed in FIG. 4.
Figure 6:
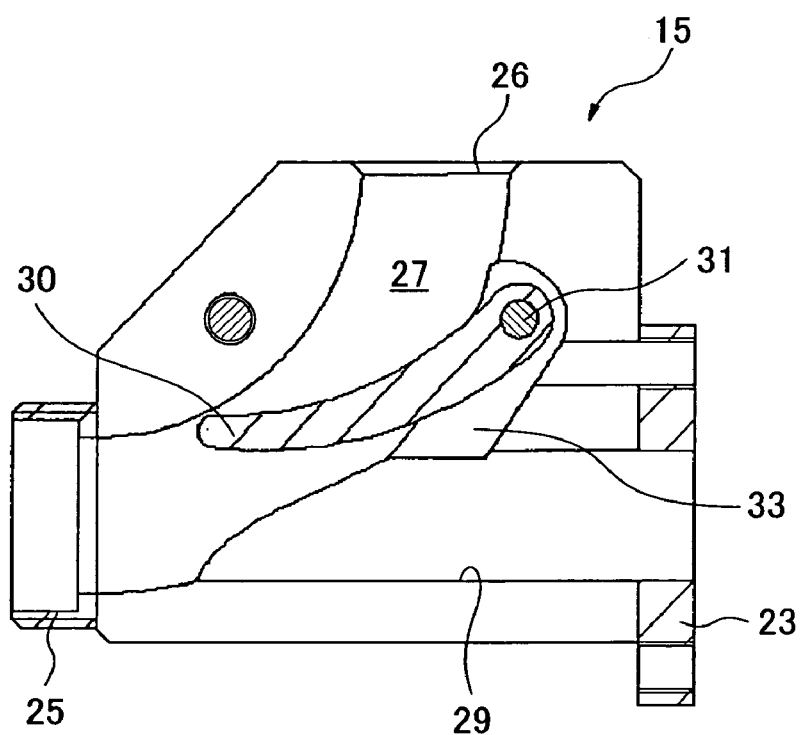
FIG. 6 is a section in the VI—VI plane of the receiver diagrammed in FIG. 5.

The details of the receiver 15 are diagrammed in FIG. 5 and FIG. 6. The receiver 15 is formed in a tubular shape of an electrically conductive material. The aft part 23 of the receiver 15 is linked to the air cylinder 11, while to the tip part 25 thereof is linked the first collet member 17. In the middle part thereof, a stud receptacle 26 linked to the feed tube 13 is opened, for receiving studs 14 sent under pressure from the feed tube 13. Inside the receiver 15, a stud feed path 27 is formed for guiding studs from the feed tube 13 to the first collet member 17. In the stud feed path 27 is formed a piston hole 29 so that the piston rod 21 and second collet member 22 can advance inside the first collet member 17. In the stud feed path 27 is deployed an opening and closing gate 30 which closes so as to prevent a stud from tumbling at the exit of the piston hole 29 and opens so as not to impede the advance of the piston rod 21 and the second collet member 22. The opening and closing gate 30 is supported so that it can turn by a pin 31, and a moving space 33 is formed on the aft side of the opening and closing gate so as not to impede the turning motion of the opening and closing gate 30. The opening and closing gate 30 sends studs that are sent under pressure to the stud receptacle 26, with their flanges to the fore, to the tip part 25, as they are, but does not interfere with the second collet member 22, which picks up the shanks of studs sent from the tip part 25 to the first collet member 17, from passing from the aft part 23 through the piston hole 29 to be inserted into the first collet member 17.

Figure 7:
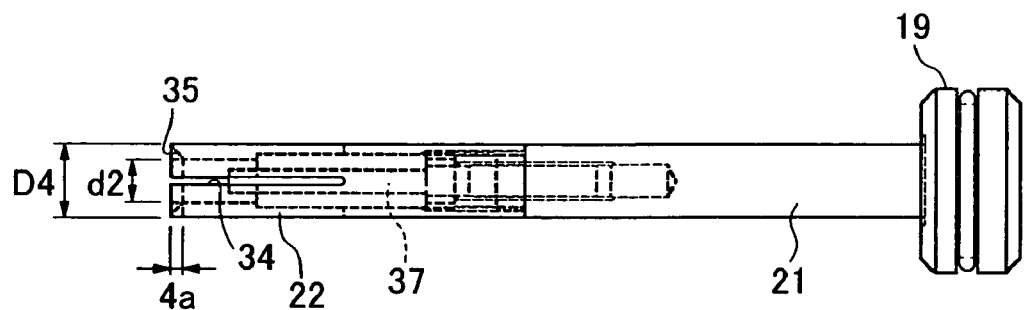
FIG. 7 is a diagram of the piston, piston rod, and first collet member in the welding gun diagrammed in FIG. 4.

The air cylinder 11, piston 19, piston rod 21, and second collet member 22 are now described with reference to FIG. 4 and FIG. 7. The air cylinder 11 forms the aft part of the welding gun 10, accommodates the piston 19 inside so that it is movable, and is supplied with compressed air on the back side of the piston (right side in FIG. 4). By the supply of compressed air, the piston 19 is moved to the tip end (left side) as indicated in FIG. 4. The configuration is made such that, in order to return the piston 19 to its original position, the compressed air at the back side of the piston is exhausted, and compressed air is supplied to the front side of the piston 19. Instead of the configuration described above, it is also permissible to make provision so that the compressed air is exhausted from the back side of the piston and vacuum suction is additionally applied. As detailed in FIG. 7, the piston rod 21 is linked to the piston 19, to the tip whereof the piston rod 21 is linked, and the piston 19, piston rod 21, and second collet member 22 are integrally linked to the piston 19. The piston 19 and piston rod 21 are formed of an electrically nonconductive material, but the second collet member 22 is formed of an electrically conductive material. The second collet member 22 is secured to the tip of the piston rod 21 by screw fastening, for example. To the tip of the second collet member 22, a plurality of divided channels 34 which extend in the axial dimension is formed so as to elastically hold the shank of the stud 14, and a taper 35 is formed to make it easy to pick up the end of the stud 14. The inner diameter of the second collet member 22 is formed so as to be either substantially the same as or slightly smaller than the outer diameter of the stud shank so as to accommodate and elastically hold the stud shank. The outer diameter of the second collet member 22 is formed smaller than the diameter of the stud flange so that the flange cannot fit inside it, and is formed slightly smaller than the inner diameter of the first collet member so that, while insertion into the first collet member 17 is possible, no more gap is created between the inner wall surface than is absolutely unavoidable. At the center axis of the second collet member 22, a stop pin 37 for limiting the depth of the second collet member extends from the piston rod 21, and provision is made so that a stud received into the second collet member 22 has the shank thereof received such that the flange thereof is protruding, so that the shank will not overly advance any farther.

Figure 8:
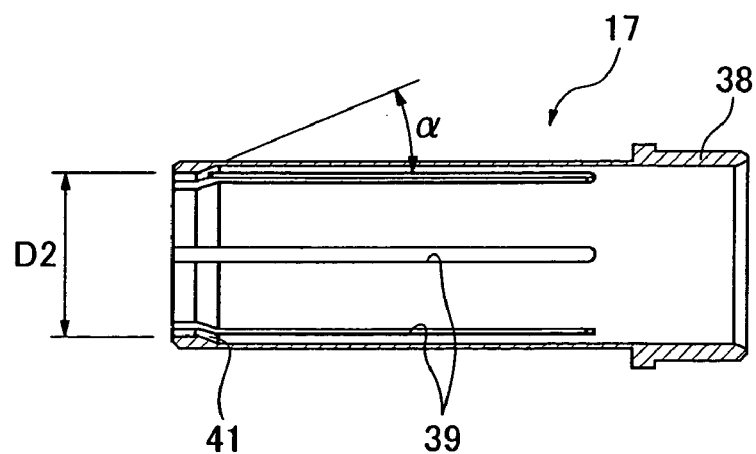
FIG. 8 is a section of the first collet member in the welding gun diagrammed in FIG. 4.

The first collet member 17 is now described with reference to FIG. 4 and FIG. 8. The first collet member 17 is formed as a tubular body of electrically conductive material, the aft part 38 thereof is secured together with the aft part of the collet cover 18 to the tip part 25 of the receiver 15, and the tip part of the tubular welding gun 10 is thus configured. At the tip of the first collet member 17, a plurality of dividing channels 39 which extend in the axial dimension is formed, exhibiting elasticity to open to the outside in the radial dimension. At the tip of the first collet member 17, moreover, a tapered part 41 is formed, made so that it that becomes smaller in diameter toward the tip so as to be smaller than the outer diameter of the stud flange. Dividing channels 39 are formed in this tapered part also, opening elastically to a larger diameter than the stud flange so that the flange can pass, but contracting in diameter elastically to the original diameter after stud flange passage to block retreat of the flange. The angle α of the tapered part 41 need only be a small angle such that flange passage is allowed but retreat is blocked. The second collet member 22 is inserted inside the first collet member 17. The inner diameter of the first collet member 17 is formed to such size that it will accept the stud flange and accept the second collet member so that it is movable with the gap kept small. The first collet member 17, except for the tapered part 41 and the aft part 38, is formed of thin material so as to have the elasticity to open outwardly in the radial dimension.

Figure 9:
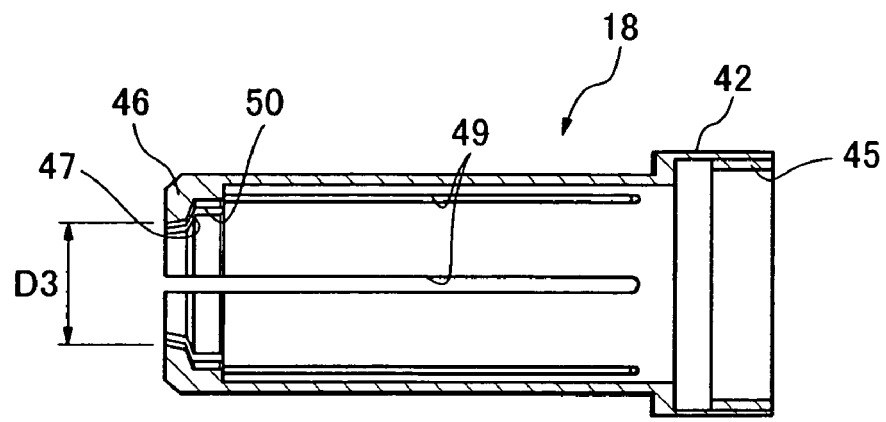
FIG. 9 is a section of the collet cover in the welding gun diagrammed in FIG. 4.
Figure 10:
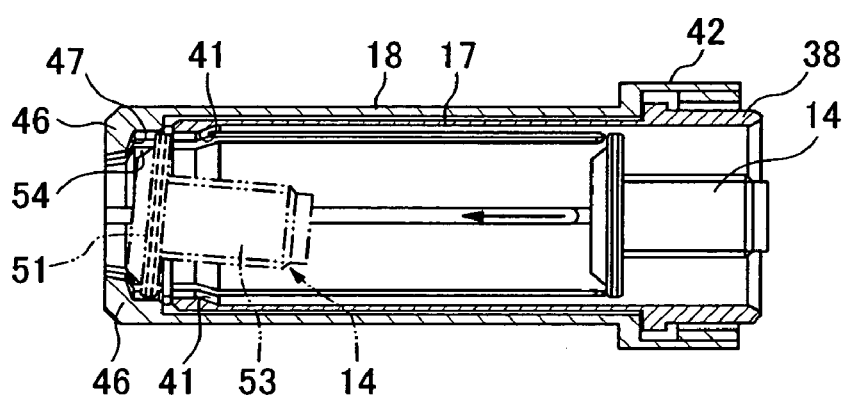
FIG. 10 is a diagram which indicates how the collet cover diagrammed in FIG. 9 is assembled with the first collet member diagrammed in FIG. 8, and how a stud usable with the welding gun of the present invention is fed and held.

The collet cover 18 is now detailed with reference to FIG. 4, FIG. 9, and FIG. 10. The collet cover 18 is formed of electrically conductive material, being formed in a shape which will enclose the entirety of the exterior of the first collet member 17, from the tip end thereof to the portion at the aft end thereof. The aft part 42 of the collet cover 18 is formed in a ring shape of larger diameter than the other parts, accepts the aft part 38 of the first collet member 17, and also accepts the tip part 25 of the receiver 15, with female threads 45 formed so as to be engaged securely by male threads 43 in the tip part 25. The main part from the aft part 42 to the tip part 46 is formed as a tubular body, and accommodates the first collet member 17 inside. The tip part 46 is formed with a small diameter so as to temporarily stop studs which are sent thereto under pressure, and a tapered part 47 is formed which becomes smaller in diameter toward the tip to make it possible to push the stud flanges to the outside of the tip. In addition, dividing channels 49 which extend in the axial dimension from the tip part 46 to the back side are formed, which open to a larger diameter than the stud flange when a stud temporarily stopped at the tip part 46 is pushed and moved so as to allow the flange to pass, and elasticity for diameter contraction after that passage is imparted to the tip part 46.

On the inside of the tip part 46 of the collet cover 18, a ring-shaped concavity 50 is formed. This works together with the tapered part 41 at the tip of the first collet member 17 to form a space for accommodating and holding the edge of the stud flange. FIG. 10 shows how, with the first collet member 17 assembled so as to be enclosed in the collet cover 18, a stud 14 is sent to the position in the first collet member 17 indicated by the solid lines, and then is sent to the position indicated by the broken lines. As indicated in FIG. 10, the ring-shaped concavity 50 on the inside of the tip part 46 of the collet cover 18 forms a flange edge carrying space 54, the aft end portion whereof is determined by the tip surface of the tapered part 41 at the tip of the first collet member 17, which accommodates and holds the flange 51 of the stud 14 and holds the end of the stud shank 53 in such attitude that it floats free from the inner wall of the first collet member 17. The flange edge carrying space 54 may be formed in any shape whatever so long as it holds the edge of a stud 14 that has passed through the tapered part 41 of the first collet member 17 and stopped at the tip part 46 of the collet cover, and holds the tip of the stud shank 53 in an attitude such that it floats free from the inner wall of the first collet member 17. Because the tip of the stud shank 53 is in an attitude of floating free from the inner wall of the first collet member 17, in this manner, it is extremely easy to accommodate the stud shank 53 in the second collet member 22, and the necessity of forming a taper in the end of the stud shank 53 is eliminated. The taper 35 in the tip of the second collet member 22 also becomes almost entirely unnecessary, and the length of the taper 35 can be shortened.

Figure 1:
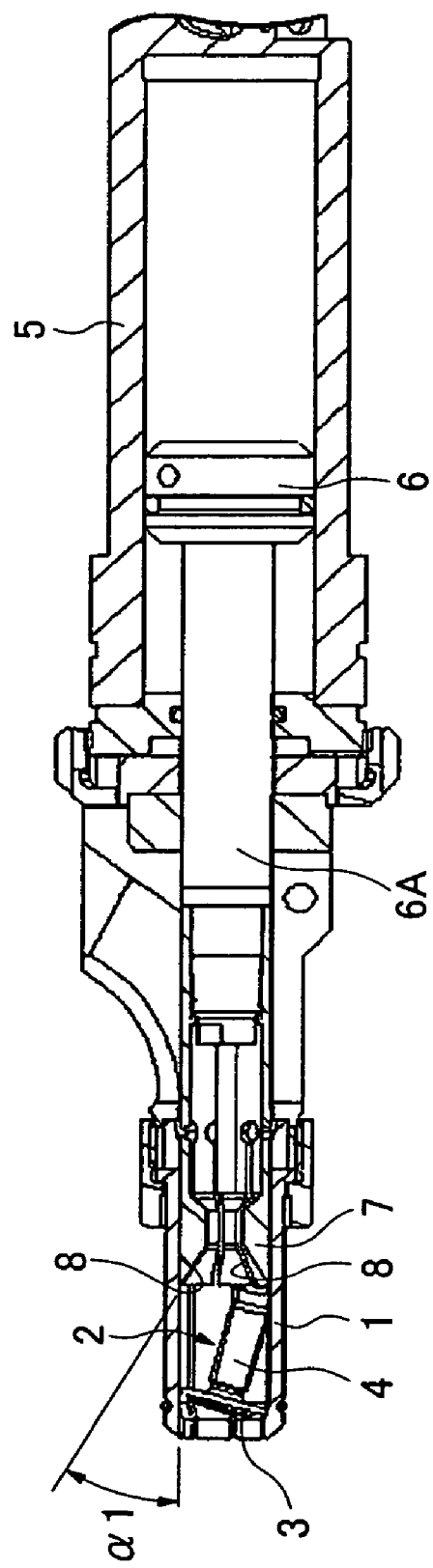
FIG. 1 is a section of a welding gun in a conventional stud welding apparatus.
Figure 2:
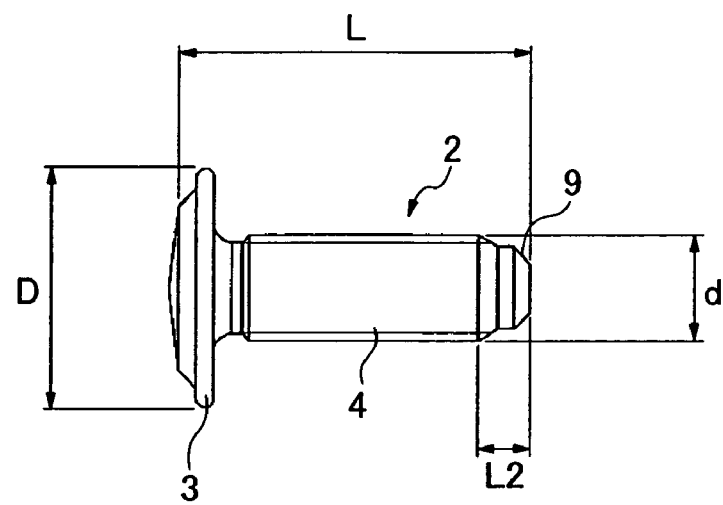
FIG. 2 is a diagram of a flanged stud used with a conventional welding gun.
Figure 11:
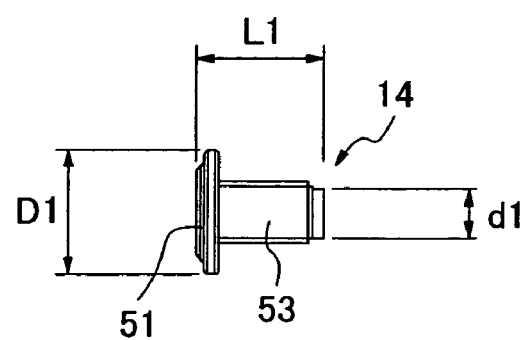
FIG. 11 is a diagram of the stud indicated in FIG. 10.

A flanged stud 14 that can be used with the stud welding apparatus to which the present invention pertains is detailed in FIG. 11. The stud 14 has a flange 51 of large diameter and a shank 53 wherein are formed screw threads or (a) circumferential groove(s), for example. The stud 14, unlike the stud 2 diagrammed in FIG. 2, has no tapered part formed at the tip of the shank 53. Let this stud 14 here have an overall length of L1, a flange 51 diameter of D1, and a shank 53 outer diameter of d1. When these are the dimensions, the inner diameter D2 of the tapered part 41 of the first collet member 17 (cf. FIG. 8) is made slightly smaller than the flange diameter D1, and blocks retreat of the flange after passage. Also, the diameter D3 of the tip part 46 of the collet cover 18 (cf. FIG. 9) is made smaller than the inner diameter D2 of the tapered part 41 and smaller than the flange diameter D1 so as to insure the temporary stoppage of the flange, and blocks retreat of the flange after the flange passes, but is selected so as to make passage of the flange possible. The outer diameter D4 of the second collet member 22 (see FIG. 7), moreover, is made smaller than the flange diameter D1. The inner diameter d2 of the second collet member (see FIG. 7) is made either substantially the same as or slightly smaller than the stud shank outer diameter d1 so that the second collet member 22 accepts and mechanically holds the stud shank 53 and also effects electrical contact. The inner diameter of the first collet member 17, furthermore, is formed to an inner diameter that accepts studs sent thereto, flange to the fore, and accepts the second collet member 22 so that it is movable, while the inner diameter of the collet cover 18 is formed so as to accept the first collet member 17 and so as to have a space in the tip part thereof that will enable opening toward the outside when the tapered part 41 at the tip of the first collet member 17 passes the stud flange 51.

Figure 12:
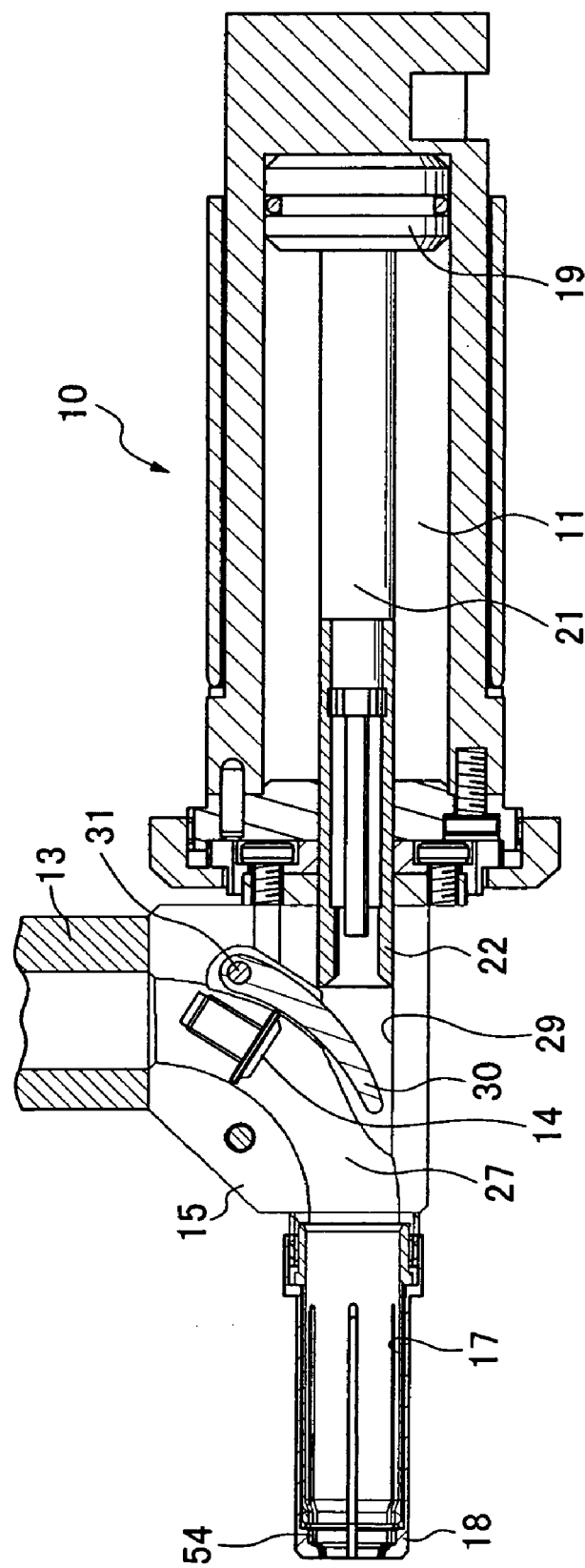
FIG. 12 is a diagram which indicates how a stud is fed into the welding gun diagrammed in FIG. 4.

The operation of the welding gun 10 of the stud welding apparatus configured as described above is now described with reference to FIG. 12 to FIG. 14. In FIG. 12, a stud 14 is supplied from a parts feeder (not shown) through the feed tube 13 to the receiver 15. When this happens, the piston rod 21 which has the second collet member 22 at its tip (and the piston 19) will be retracted to the start position inside the air cylinder 11, and will have opened the stud feed path 27 inside the receiver 15. The opening and closing gate 30 is pushed against the wall surface of the receiver 15 by the compressed air which sends the stud 14 under pressure, so the piston hole 29 will be closed off, and the stud 14 will pass through the stud feed path 27 inside the receiver 15. Reference is now made to FIG. 10 which shows how the stud 14 which has passed through the stud feed path 27 is sent to the first collet member 17. The stud 14 which has passed through the receiver 15 is sent under pressure toward the tapered part 41 at the tip, inside the first collet member 17 by compressed air. The flange 51 of the stud 14, due to the pressure of the compressed air, pushes open the tapered part 41, arrives at the tapered part 47 of the tip part 46 of the collet cover 18, and stops. As described earlier, the flange edge carrying space 54 is formed between the tip part 46 of the collet cover 18 and the tapered part 41 of the first collet member 17. This space 54 holds a stud flange 51 that has entered this space 54 by its edge, and holds the end of the stud flange 51 in an attitude such that it floats free from the inner wall of the first collet member 17. At this time, even if the stud 14 tends to change its attitude, the edge of the flange 51 is limited inside the flange edge carrying space 54, wherefore the end of the stud shank 53 is limited to a free-floating attitude relative to the inner wall surface of the first collet member 17.

Figure 13:
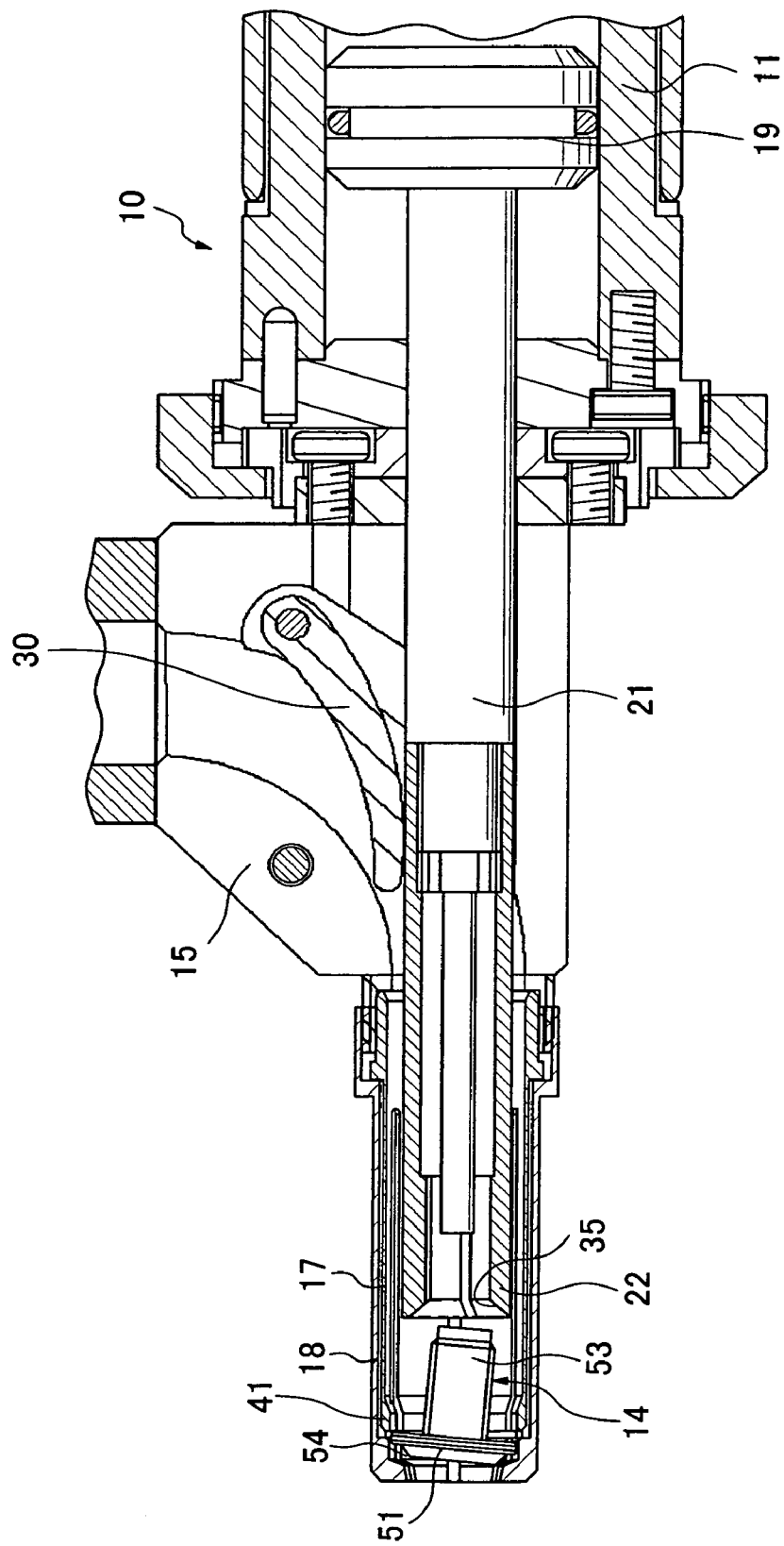
FIG. 13 is a diagram indicating how a stud is picked up by the second collet member in the welding gun diagrammed in FIG. 4.

Next, as diagrammed in FIG. 13, compressed air is supplied to the air cylinder 11 from the back side of the piston 19, the piston 19 and the piston rod 21 advance, and the second collet member 22 at the tip of the piston rod 21 turns the opening and closing gate 30 from the piston hole 29 of the receiver 15, passes through the receiver 15, and is inserted into the first collet member 17. The second collet member 22 which advances inside the first collet member 17 picks up the end of the shank 53 of the stud 14 by the taper 35 part at the tip thereof and accommodates the shank 53 in the interior thereof. The end of the stud shank 53 is secured in an attitude such that it floats free from the inner wall surface of the first collet member 17, wherefore, even if there is almost no taper 35 part at the tip of the second collet member 22, the end of the shank 53 can be picked up and accommodated inside the second collet member 22. The stud shank 53 50 accommodated is mechanically held in the second collet member 22 and makes electrical contact.

Figure 14:
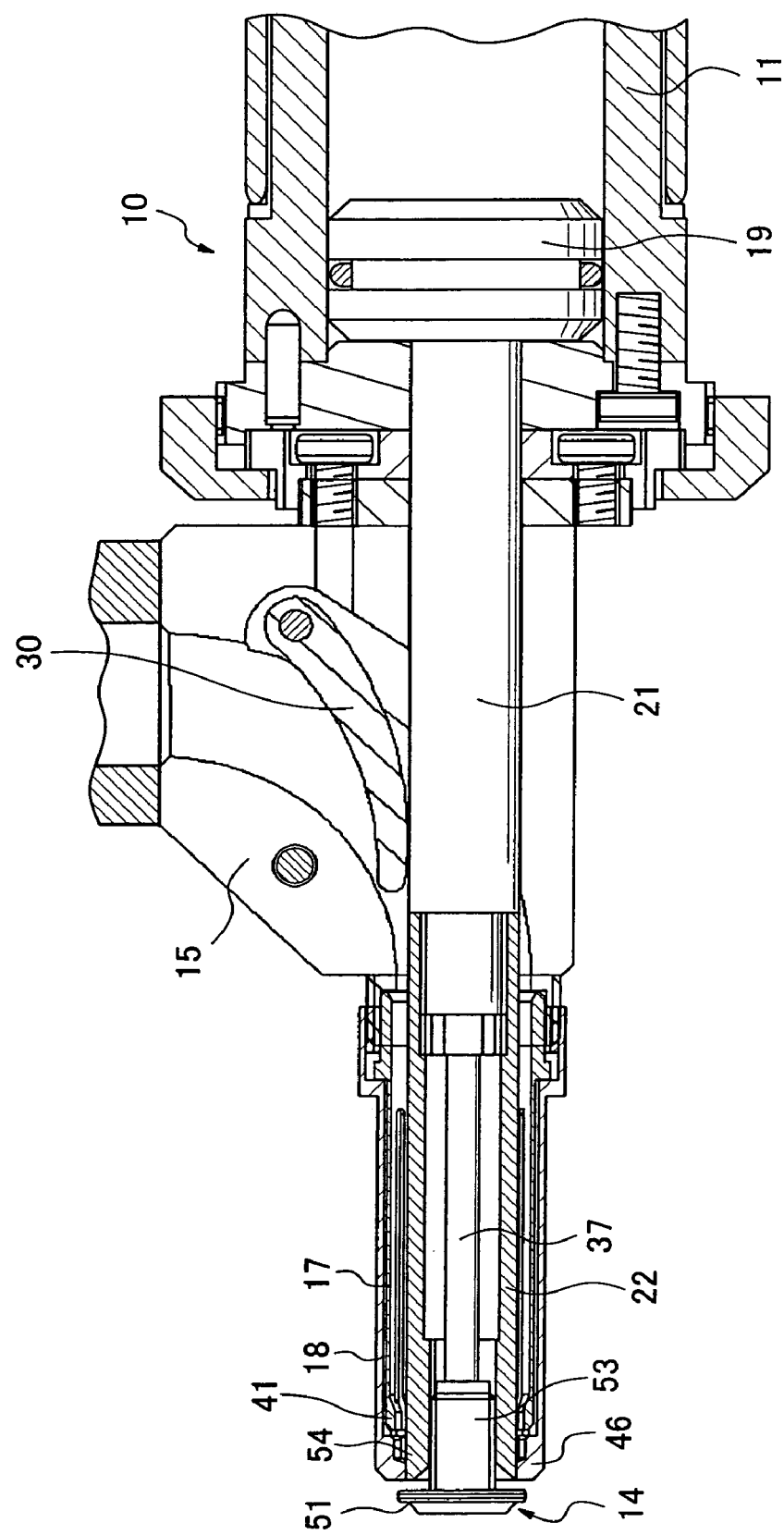
FIG. 14 is a diagram representing the condition of completed preparation for welding, with a stud held at the tip of the welding gun diagrammed in FIG. 4.

When compressed air is further supplied to the air cylinder 11, the piston 19 and the piston rod 21 move in the direction of the tip, as diagrammed in FIG. 14, and the second collet member 22 that accommodates and holds the shank 53 of the stud 14 moves inside the first collet member 17 to the tip end with the flange 51 that is in the flange edge carrying space 54 to the fore. In the second collet member 22, because the stop pin 37 extends from the piston rod 21, the stud shank 53 will not be admitted inside the second collet member 22 more than a certain length, but will be held with the flange 51 protruding a prescribed length. Meanwhile, the piston 19 moves as is to the stroke end, wherefore the second collet member 22 at the tip of the piston rod 21 will push the flange 51, of the stud 14 being held, so that it pushes apart the wall of the tip part 46 of the collet cover 18. The stud 14, as a consequence thereof, is held mechanically and securely, and inserted into the first collet member 17 inside the collet cover 18 with the shank 53 electrically connected to the second collet member 22, in such condition that the flange 51 protrudes a certain length from the tip part 46 of the collet cover 18. In this manner, the studs 14 are automatically loaded in an appropriate attitude at the tip of the welding gun 10. In this condition, the electrically conductive collet cover 18, the electrically conductive first collet member 17, the electrically conductive second collet member 22, and the electrically conductive receiver 15 make electrical contact. Therefore, if a welding current is supplied either directly to the receiver 15 or through the air cylinder 11 to the receiver 15, welding to the stud 14 will become possible.

After the welding of the stud 14 is finished, the compressed air at the back side of the piston 19 in the air cylinder 11 is exhausted, and compressed air is supplied to the front side of the piston 19. Thereby, the piston 19 is returned to its original position, and the second collet member 22 at the tip of the piston rod 21 is also returned to the position indicated in FIG. 12. Provision may also be made so as to apply vacuum suction also while exhausting the compressed air from the air cylinder chamber on the back side of the piston, and thereby cause the piston 19, the piston rod 21, and the second collet member 22 to return.

Figure 3:
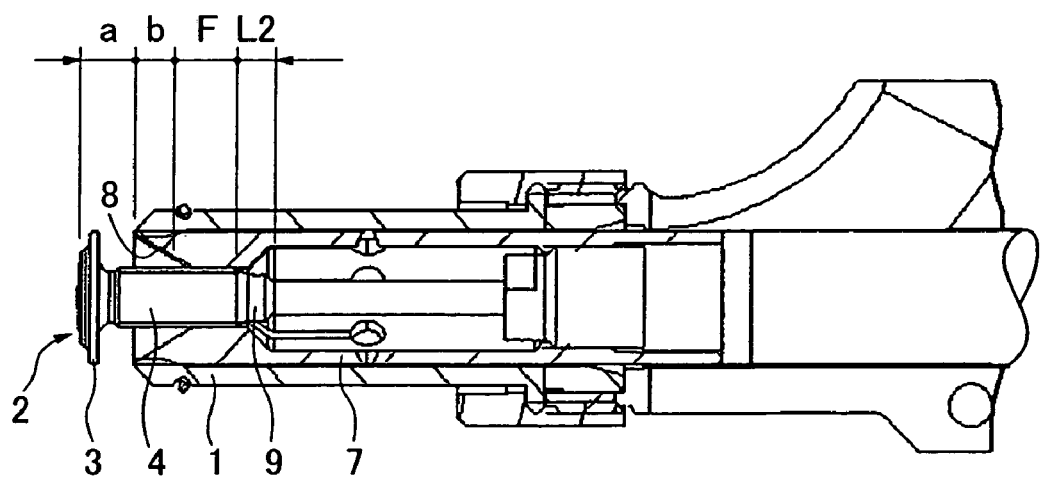
FIG. 3 is a section of the tip end part of the welding gun diagrammed in FIG. 1 wherein the stud diagrammed in FIG. 2 is held.

As described in the foregoing, the stud 14 is held so that the end of the shank 53 is in an attitude wherein it is floating free from the inner wall of the first collet member 17. Therefore, the stud shank 53 is readily accommodated in the second collet member 22, no tapered part whatever is necessary at the tip of the stud shank, the length L2 of the tapered part at the tip of the shank diagrammed in FIG. 2 and FIG. 3 can be done away with, and the length b of the tapered part 8 of the second collet member diagrammed in FIG. 2 and FIG. 3 can be considerably shortened. The overall length L1 of the stud 14 diagrammed in FIG. 11 can be shortened to a length of from 1.0×D1 to 1.2×D1 (where D1 is the diameter of the flange 51).

While a preferred embodiment of the invention has been shown and described, it will be apparent that changes can be made without departing from the principles and spirit of the invention, the scope of which is defined in the following claims.

What is claimed is:

1. A stud welding apparatus having a collet for holding a stud with a flange and a shank at the tip of a welding gun, said collet comprising:
   a tubular first collet member secured to the tip of said welding gun, for elastically opening to a larger diameter than said flange to hold said flange at the tip; and
   a tubular second collet member secured to the tip of a piston rod that extends toward said first collet member from a cylinder provided in the aft portion of said welding gun, capable of insertion into said first collet member, for, by the movement of said piston, picking up, accommodating, and holding the shank of a stud fed with the flange to the fore into the interior of said first collet member, wherein:
   a collet cover is provided for enclosing the exterior of said first collet member from the tip of the welding gun; and a tip of said collet cover and a tip of said first collet member cooperatively form a flange edge carrying space shaped to accommodate and hold an edge of the stud flange and holding the stud shank in an attitude such that it floats free of an inner wall of said first collet member.

2. The apparatus according to claim 1, wherein axial dividing channels are formed in the tip of said collet cover, exhibiting elasticity such that, when a flange that is in said flange edge carrying space is pushed and moved, the tip of said collet cover expands to a larger diameter than said flange, to allow the passage of said flange, and contracts in diameter after that passage to hold the stud shank together with said first collet member.

3. The apparatus according to claim 1, wherein said second collet member is such that the depth of a cylindrical member that accepts the stud shank is limited by a stop pin that extends from said piston rod.

4. The apparatus according to claim 1, wherein said collet cover, said first collet member, and said second collet member are formed of an electrically conductive material.

5. The apparatus according to claim 1, wherein a receiver to which is linked a feed tube for feeding studs is deployed between said first collet member and said cylinder, said receiver has formed therein a stud feed path for guiding studs from the feed tube to the first collet member, a piston hole is formed in said stud feed path such that said piston of said cylinder and said second collet member can advance into the interior of said first collet member, and an opening and closing gate is deployed in said stud feed path, which closes so as to prevent studs from tumbling in said piston hole and opens so as not to impede the movement of said piston and second collet member.

* * * * *